United States Patent [19]
Heckt

[11] Patent Number: 4,954,879
[45] Date of Patent: Sep. 4, 1990

[54] APPARATUS AND METHOD FOR COMPRESSING A VIDEO SIGNAL

[75] Inventor: Neil W. Heckt, Bellevue, Wash.
[73] Assignee: The Boeing Company, Seattle, Wash.
[21] Appl. No.: 287,211
[22] Filed: Dec. 20, 1988
[51] Int. Cl.5 .............................................. H04N 7/13
[52] U.S. Cl. ....................................... 358/13; 358/16; 358/23
[58] Field of Search ................... 358/13, 16, 21 R, 23, 358/31, 12

[56] References Cited
U.S. PATENT DOCUMENTS

| | | | |
|---|---|---|---|
| 3,996,607 | 12/1976 | Heitmann | 358/13 |
| 4,023,199 | 5/1977 | Netravali et al. | 358/13 |
| 4,129,882 | 12/1978 | Limb | 358/13 |
| 4,141,034 | 2/1979 | Netravali et al. | 358/13 |
| 4,573,167 | 2/1986 | Hentschke et al. | 375/27 |
| 4,583,114 | 4/1986 | Catros | 358/13 |
| 4,598,411 | 7/1986 | Berkovich et al. | 375/27 |
| 4,701,783 | 10/1987 | Glenn | 358/12 |
| 4,768,082 | 8/1988 | Hiratsuke | 358/13 |
| 4,772,938 | 9/1988 | Sasson | 358/21 R |
| 4,774,562 | 9/1988 | Chen | 358/13 |

Primary Examiner—Tommy P. Chin
Attorney, Agent, or Firm—Finnegan, Henderson, Farabow, Garrett & Dunner

[57] ABSTRACT

An apparatus and method for compressing a video signal wherein red, green and blue color video signals are input into an apparatus, and a brightness signal and at least two color difference signals are generated therefrom, encoded and stored in a memory. The encoded signals may then be decoded and combined to form an approximated video signal. The brightness signal is encoded using pulse code modulation and the color difference signals are encoded using differential pulse code modulation to reduce storage requirements.

4 Claims, 7 Drawing Sheets

APPARATUS AND METHOD FOR COMPRESSING A VIDEO SIGNAL

BACKGROUND OF THE INVENTION

2. Field of the Invention

The invention relates to an apparatus and method for compressing a video signal, in general, and specifically relates to an apparatus and method wherein red, green and blue color video signals are inputted into an apparatus, and a brightness signal and at least two color difference signals are generated therefrom, encoded and stored in a memory. The signals may then be decoded and combined to form a close approximation of the original video signal The brightness signal is encoded using pulse code modulation and the color difference signals are encoded using differential pulse code modulation to reduce memory storage requirements.

2. Related Art

General methods for encoding color video signals are known in the art. For example, systems for digitally transmitting color television signals are known, wherein color signals are divided into various components and the components are encoded. The encoded signals are fed into a time multiplex combiner to obtain a serial output data stream.

Other examples of known signal encoding methods provide a data compression system for transmitting data at a reduced data rate; a color television transmission system for transmitting encoded signals at half the input rate; and a color video signal encoder which encodes color signals into a plurality of variable length words which are then serially transmitted to a buffer.

Still other color video systems use pulse code modulation techniques to encode each primary color signal of a color video system. Thus, in a typical system comprised of red, green and blue video signals, three identical pulse code modulation encoders are required to encode and store the color signal.

In the known systems described above, however, the electronic circuitry necessary to implement the encoding and storage functions is disadvantageously complex, resulting in increased cost, size, weight and power dissipation of the video signal compression and encoding system.

SUMMARY OF THE INVENTION

It is therefore an object of the invention to provide an apparatus and method for effectively encoding and decoding a color video signal.

It is a further object of the invention to provide an apparatus and method for efficiently compressing a video signal which has reduced size, weight and power consumption.

It is a still further object of the invention to provide an apparatus and method for compressing a video signal which requires reduced memory storage capacity.

These and other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided an apparatus and method for compressing a video signal consisting of red, green and blue color video signals. A brightness signal generator operates in response to the red, green and blue color video signals and generates a brightness signal according to a first predetermined formula. A difference signal generator operates in response to the red, green and blue color video signals and the brightness signal and generates at least two color difference signals according to a second predetermined formula. First and second encoders encode the brightness signal and color difference signals, respectively, and the encoded signals are stored in a memory. The signals may then be decoded and combined to approximate the original video signal.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

The preferred embodiment of the apparatus and method for approximating a video signal will now be described with reference to FIG. 1. RED, GREEN and BLUE components of a color video signal are fed into the apparatus of the present invention by a color video generator (not shown). The RED, GREEN and BLUE components are multiplied by constant scaling factors K1, K2 and K3, respectively. The product signals, K1*RED, K2*GREEN and K3*BLUE are input into an adder 22. Adder 22 adds the signals and outputs a brightness signal Y.

Two of the RED, GREEN and BLUE input signals are fed to adders 20, 24, respectively. FIG. 1, for example, illustrates the RED input signal being fed to adder 20 and the BLUE signal being fed to adder 24. However, any two of the RED, GREEN and BLUE input signals may be fed to adders 20, 24. Only two of the difference signals need be encoded, since the third difference signal may be derived arithmetically from the known signals, as discussed below.

Brightness signal Y is outputted from adder 22 according to the following equation:

$$Y = K1*RED + K2*GREEN + K3*BLUE \quad (1)$$

Equations 2, 3 and 4 follow from equation 1:

$$(RED-Y) = (1-K1)*RED - K2*GREEN - K3*BLUE \quad (2)$$

$$(GREEN-Y) = -K1*RED + (1-K2)*GREEN - K3*BLUE \quad (3)$$

$$(BLUE-Y) = -K1*RED - K2*GREEN + (1-K3)*BLUE \quad (4)$$

Figure 1:
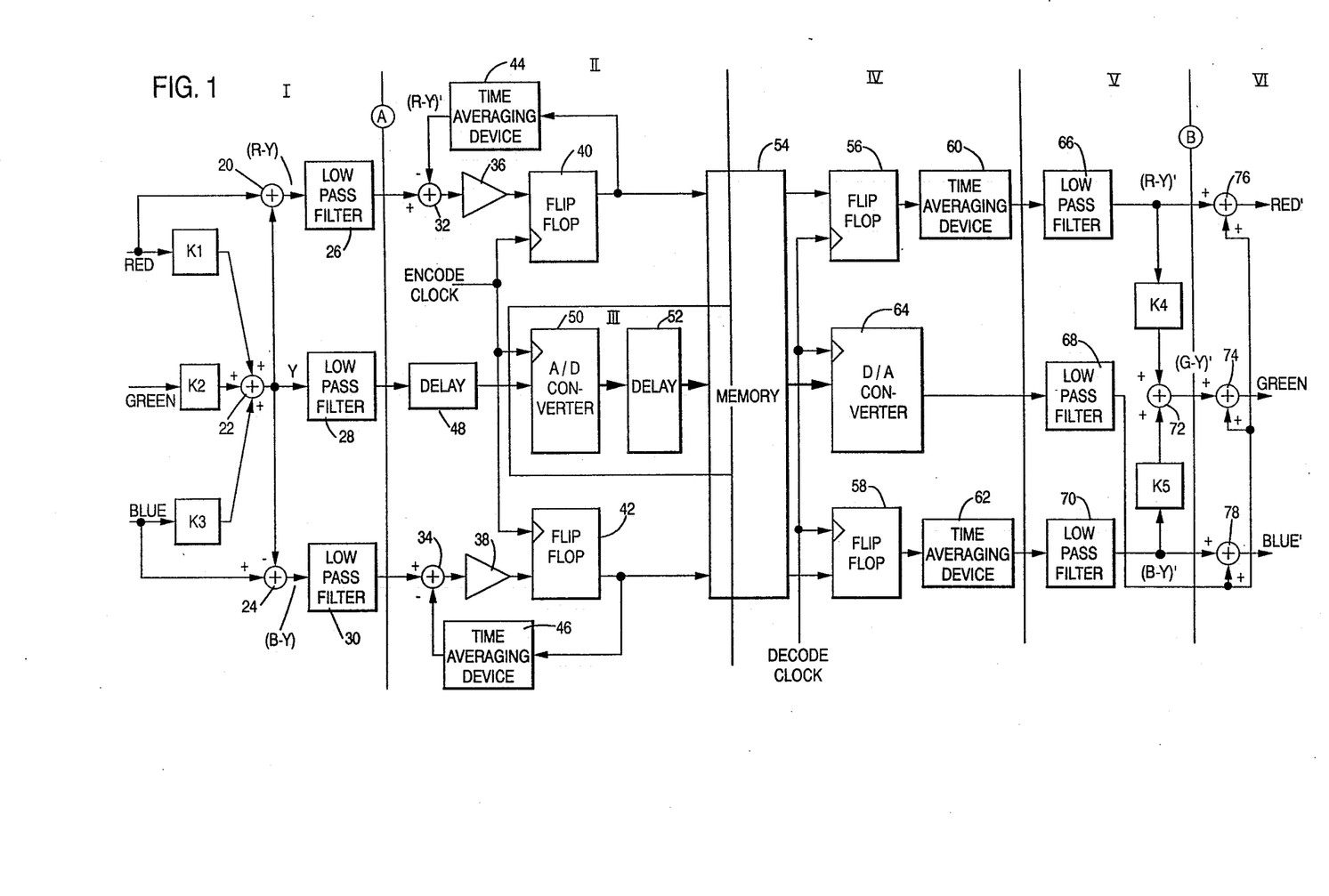
FIG. 1 is a functional block diagram of an apparatus for approximating a video signal according to a preferred embodiment of the present invention.

If, as shown in FIG. 1, the brightness signal Y outputted from adder 22 is subtracted from the RED input signal by adder 20 and from the BLUE input signal by adder 24, the signal (RED−Y) is outputted from adder 20 and the signal (BLUE−Y) is outputted from adder 24. The third difference signal, (GREEN−Y) may then be derived from the known difference signals (RED−Y) and (BLUE−Y) and the constants K1, K2 and K3 as follows:

$$(GREEN-Y) = K4*(RED-Y) + K5*(BLUE-Y), \quad (5)$$

where $$K4 = -K1/(1-K1-K3), \text{ and} \quad (6)$$

$$K5 = -K3/(1-K1-K3). \quad (7)$$

As a result, only two of the RED, GREEN and BLUE input signals are needed to determine two color difference signals since the third color difference signal may be derived arithmetically.

The RED and BLUE color difference signals outputted from adders 20, 24 are sent to narrowband low-pass filters 26, 30, respectively, which set the bandwidth of the color difference signals. The brightness signal Y is outputted from adder 22 and fed to a wideband low-pass filter 28 to set the bandwidth of the brightness signal.

The RED and BLUE color difference signals are fed from low-pass filters 26, 30 to adders 32, 34, respectively, which compute the differences Δ(RED−Y)=(RED−Y)−(RED−Y)' and Δ(BLUE−Y)=(BLUE−Y)−(BLUE−Y)', respectively. The signals (RED−Y)' and (BLUE−Y)' are outputted from averaging devices 44, 46, as illustrated in FIG. 1 and discussed in further detail below.

The difference signals outputted from adders 32, 34 are provided as inputs to respective voltage comparators 36, 38, which convert the difference signals into digital logic levels. The digital logic level signals are then fed to flip-flops 40, 42, respectively, which store the logic level outputs from voltage comparators 36, 38 between successive encode clock pulses. Flip-flops 40, 42 and analog-to-digital converter 50 are clocked by an encode clock signal. Flip-flops 40, 42 output binary logic level signals to time averaging devices 44, 46, which compute the time average of the binary outputs of flip-flops 40, 42. Time averaging devices 44, 46 employ a predetermined algorithm to generate signals (RED−Y)' and (BLUE−Y)' that closely approximate color difference signals (RED−Y) and (BLUE−Y). The signals (RED−Y)' and (BLUE−Y)' generated by time averaging devices 44, 46 are fed back into adders 32, 34 where they are subtracted from color difference signals (RED−Y) and (BLUE−Y), as discussed above. The closed loop operation of adder 32, comparator 38, flip-flop 40 and time averaging device 44, and adder 34, comparator 38, flip-flop 42 and time averaging device 46 causes the time average of the outputs of flip-flops 40, 42 to closely approximate difference signal (RED−Y) output from filter 26 and color difference signal (BLUE−Y) output from filter 30.

As the time delay of color difference signals (RED−Y) and (BLUE−Y) through low-pass filters 26, 30 and time averaging devices 60, 62, respectively, may be greater than the time delay of brightness signal Y through low-pass filters 28, 68, a time delay correction may be applied either by analog time delay device 48 or digital time delay device 52, or both. The total time delay from point A to point B, as illustrated in FIG. 1, through the Y channel should be equal to the total time delay through each of the (RED−Y) and (BLUE−Y) channels. The optionally delayed brightness signal Y is then inputted into high speed analog-to-digital converter 50, which digitizes the brightness signal. The digitized brightness signal Y may then be optionally further delayed by digital delay 52. The digital brightness signal Y output from delay 52 is fed to memory 54.

In addition to being inputted into time averaging devices 44, 46, the digitally encoded color difference signals (RED−Y) and (BLUE−Y) outputted from flip-flops 40, 42 are fed to memory 54. Flip-flops 56, 58 are required by the present device only if memory 54 does not directly supply a usable digital interface. Otherwise, flip-flops 56, 58 may be omitted from the circuit. Flip-flops 56, 58, if present, and digital-to-analog converter 64 are clocked by a decode clock signal provided by a conventional clocking source (not shown).

The digitally encoded RED and BLUE color difference signals are outputted from flip-flops 56, 58 and fed to time averaging devices 60, 62, respectively. Time averaging devices 60, 62 are similar to devices 44, 46, and are used to compute the time average of the input color difference signals. The time-averaged difference signals are fed to low-pass filters 66, 70, which filter undesirable frequencies from the signals.

The brightness signal Y outputted from the digital-to-analog converter 64 is fed to low-pass filter 68, which filters the brightness signal Y to remove undesirable frequencies therefrom. The filtered brightness signal Y is then fed to adders 74, 76, 78, as illustrated in FIG. 1.

The (RED−Y)' and (BLUE−Y)' color difference signals are multiplied by constants K4, K5, defined in Equations (6) and (7) and are inputted to adder 72 to generate color difference signal (GREEN−Y)'. The filtered color difference signals (RED−Y)', (BLUE−Y)' and (GREEN−Y)' are fed to adders 76, 78 and 74, respectively, which sum the color difference signals with the filtered brightness signal Y to reproduce close approximations RED', GREEN' and BLUE' of the original RED, GREEN and BLUE input signals according to the following equations:

$$RED' = (RED-Y)' + Y \quad (8)$$

$$GREEN' = (GREEN-Y)' + Y \quad (9)$$

$$BLUE' = (BLUE-Y)' + Y \quad (10)$$

FIGS. 2 through 7 illustrate examples of preferred electrical components for carrying out the functions of the blocks illustrated in sections I through VI of FIG. 1. In a preferred embodiment, constants K1, K2 and K3 are set at 0.25, 0.50 and 0.25, respectively. Brightness signal Y may be digitized into six bits using pulse code modulation techniques produced by the circuitry illustrated in FIGS. 2 through 7. The RED and BLUE color difference signals may be digitized into one bit each using differential pulse code modulation techniques. The decoded output signals RED', GREEN' and BLUE' are reconstructed from eight bits per sample.

Figure 2:
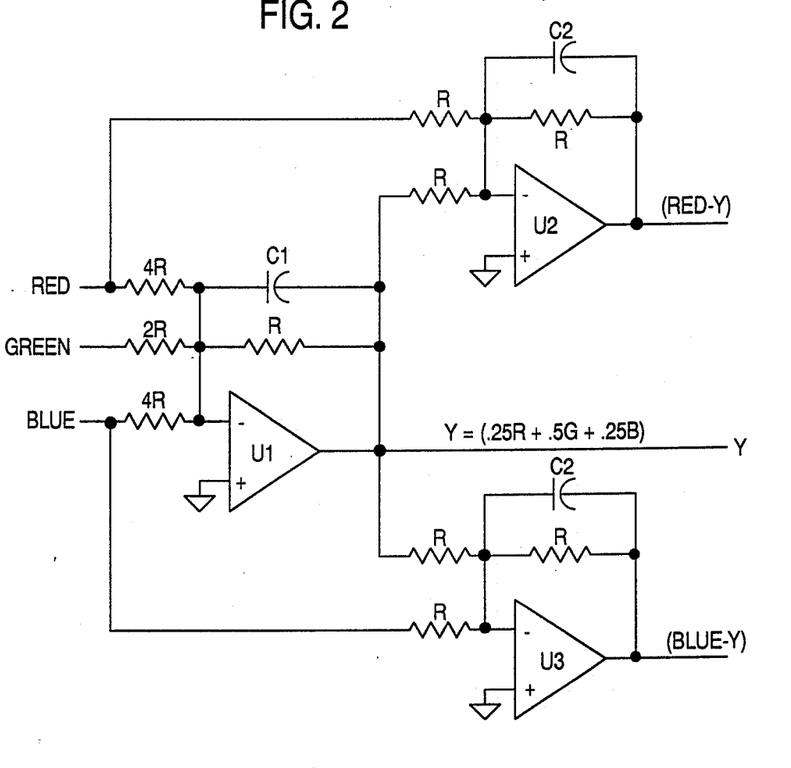
FIG. 2 is a schematic diagram illustrating preferred electrical components for carrying out the functions of the blocks in section I of FIG. 1.

FIG. 2 illustrates preferred electrical components for receiving input RED, GREEN, and BLUE components from a color video generator (not shown). The amplitudes of the components are reduced by the resistor circuitry illustrated in the figure. By using resistors having the relative values shown, a brightness signal Y is produced having an amplitude defined by Y=0.25*RED+0.5*GREEN+0.25*BLUE, as described above in connection with Equation 1. R preferably has a value of 10 K ohms.

Operational amplifiers U1, U2, and U3 and their associated circuitry operate as low-pass filters and may preferably have bandwidths of 4.5 mhz, 0.5 mhz, and 0.5 mhz, respectively, and output difference signals (RED−Y) and (BLUE−Y) and brightness signal Y as shown.

Figure 3:
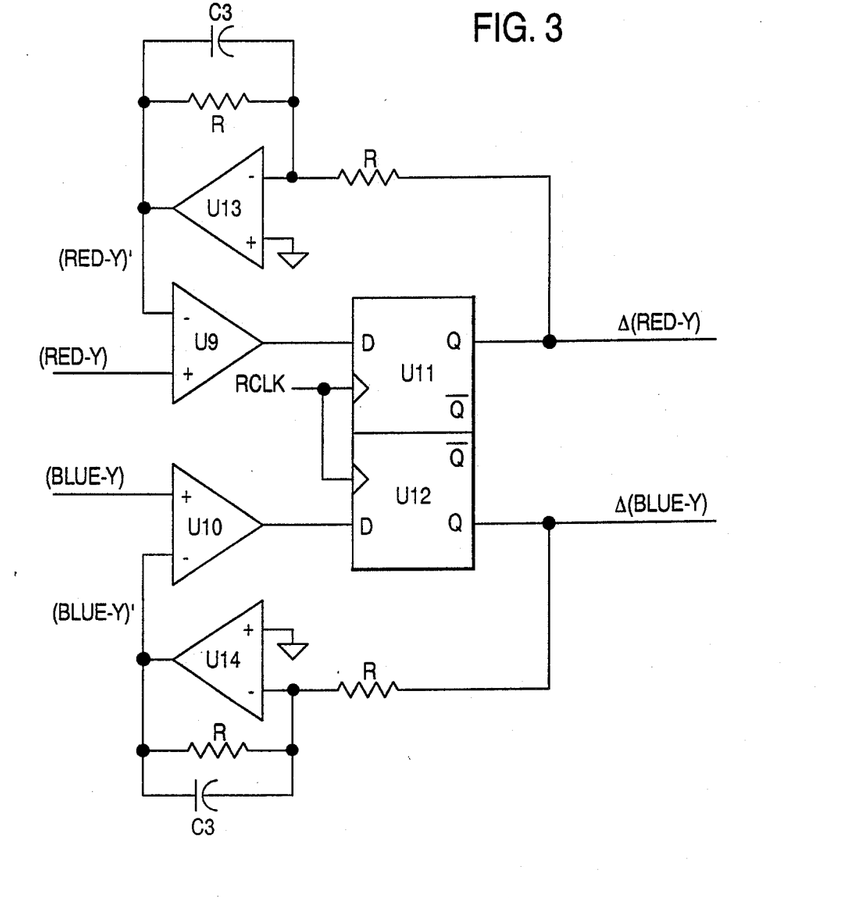
FIG. 3 is a schematic diagram illustrating preferred electrical components for carrying out the functions of the blocks in section II of FIG. 1.

As shown in FIG. 3, difference signals (RED−Y) and (BLUE−Y) are fed to voltage comparators U9, U10. Operational amplifiers U13, U14 and their respective associated circuitry operate as time averaging devices and are coupled to the inputs of voltage comparators U9, U10. The outputs of voltage comparators U9, U10 are provided as inputs to flip-flops U11, U12. Flip-flops U11, U12 output difference signals Δ(RED−Y) and Δ(BLUE−Y), respectively.

Figure 4:
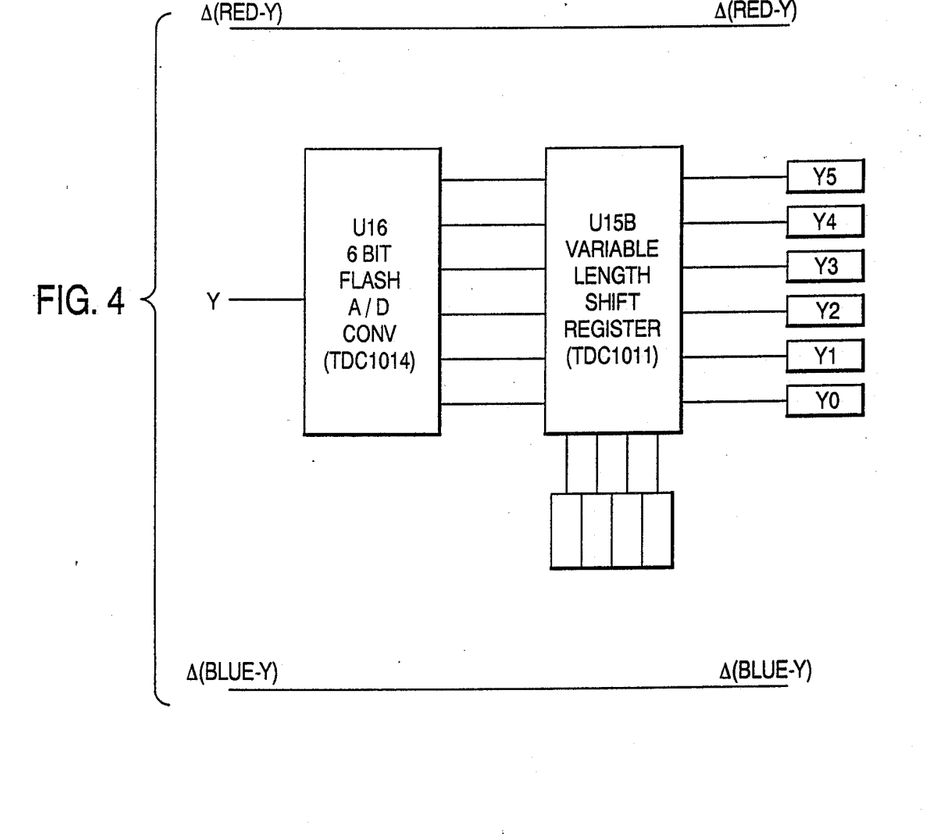
FIG. 4 is a schematic diagram illustrating preferred electrical components for carrying out the functions of the blocks of section III of FIG. 1.

FIG. 4 illustrates an analog-to-digital converter U16 that converts brightness signal Y to a digital signal. Converter U16 outputs a 6-bit digital brightness signal Y0-Y5 to a variable length shift register U15B that operates as a digital time delay.

Figure 5:
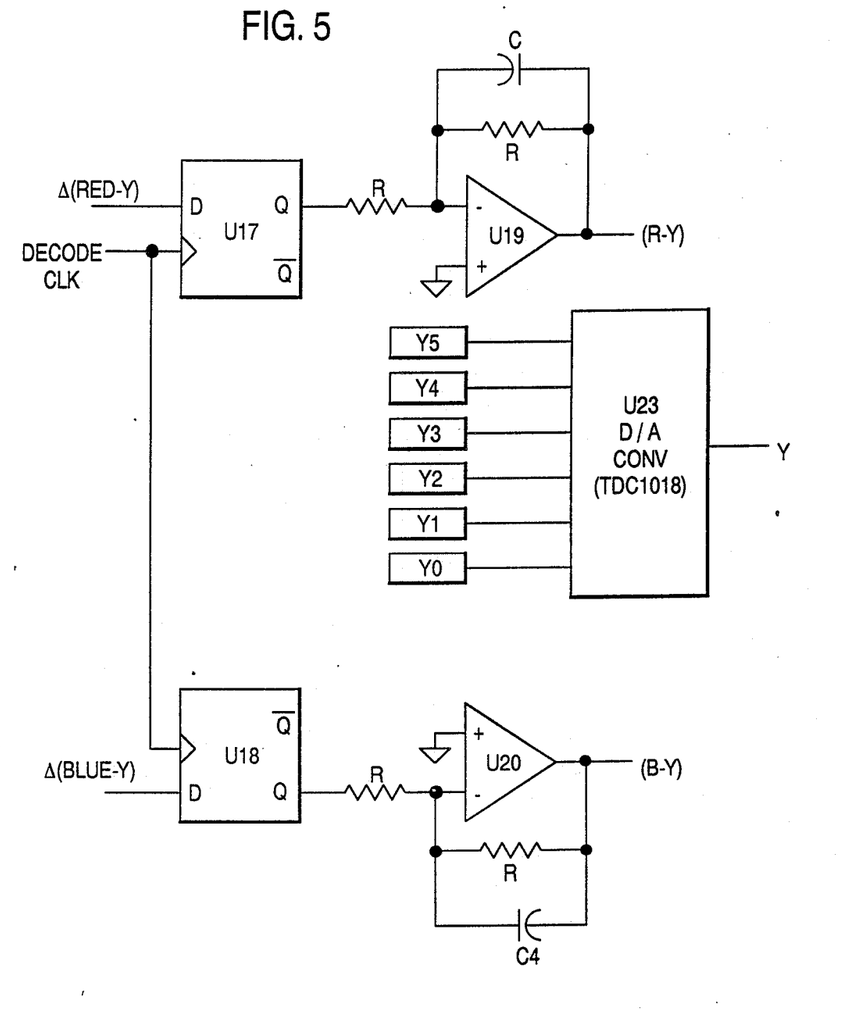
FIG. 5 is a schematic diagram illustrating preferred electrical components for carrying out the functions of the block in section IV of FIG. 1.

Difference signals Δ(RED−Y) and Δ(BLUE−Y) are passed to memory 54 along with brightness signal Y. The output of memory 54 is fed to flip-flops U17, U18, as illustrated in FIG. 5. Flip-flops U17, U18 output signals to operational amplifiers U19, U20 which, along with their associated circuitry, operate as time averaging devices for taking the time average of difference signals Δ(RED−Y) and Δ(BLUE−Y), respectively. Output from operational amplifiers U19, U20 are difference signals (RED−Y) and (BLUE−Y). FIG. 5 also illustrates a digital-to-analog converter U23 that receives the six bit digitized brightness signal Y0-Y5 from memory 54 and outputs an analog brightness signal Y.

Figure 6:
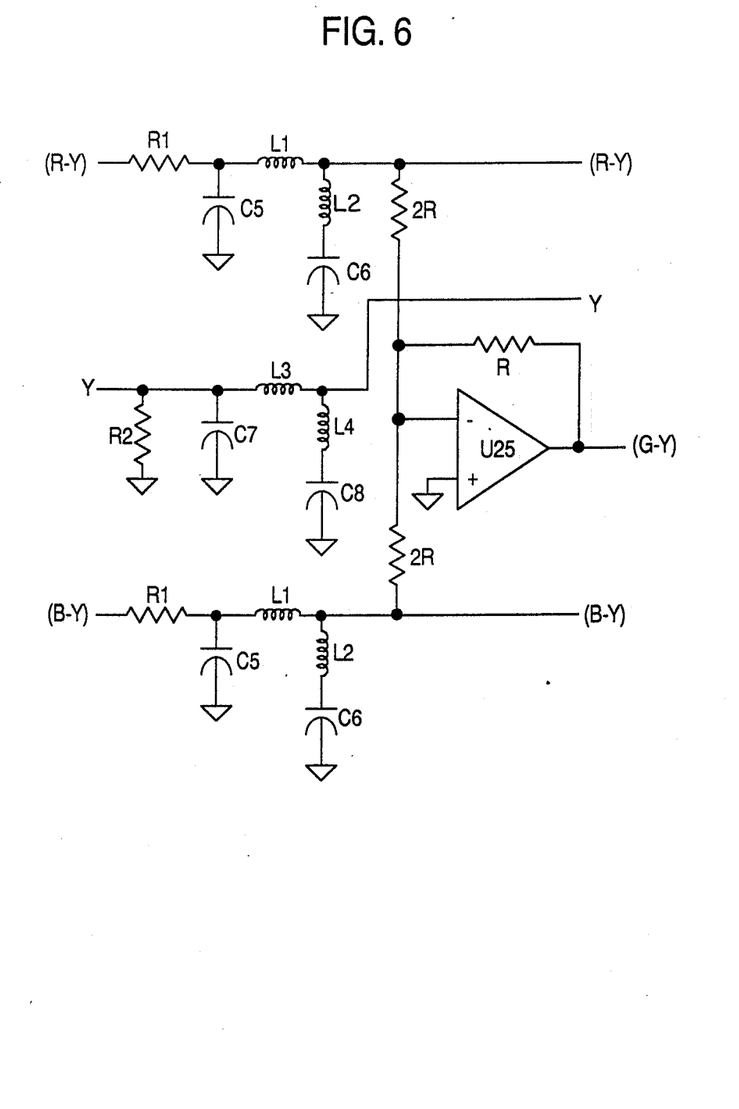
FIG. 6 is a schematic diagram illustrating preferred electrical components for carrying out the functions of the blocks in section V of FIG. 1.

FIG. 6 illustrates preferred electrical components for filtering color difference signals (RED−Y) and (BLUE−Y) and brightness signal Y. Specifically, components R1, C5, L1, L2 and C6 operate as low-pass filters to filter difference signals (RED−Y) and (BLUE−Y). Similarly, components R2, C7, L3, L4 and C8 filter brightness signal Y. Operational amplifier U25 and its associated circuitry receive filtered difference signals (RED−Y)' and (BLUE−Y)' and output color difference signal (GREEN−Y)'.

Figure 7:
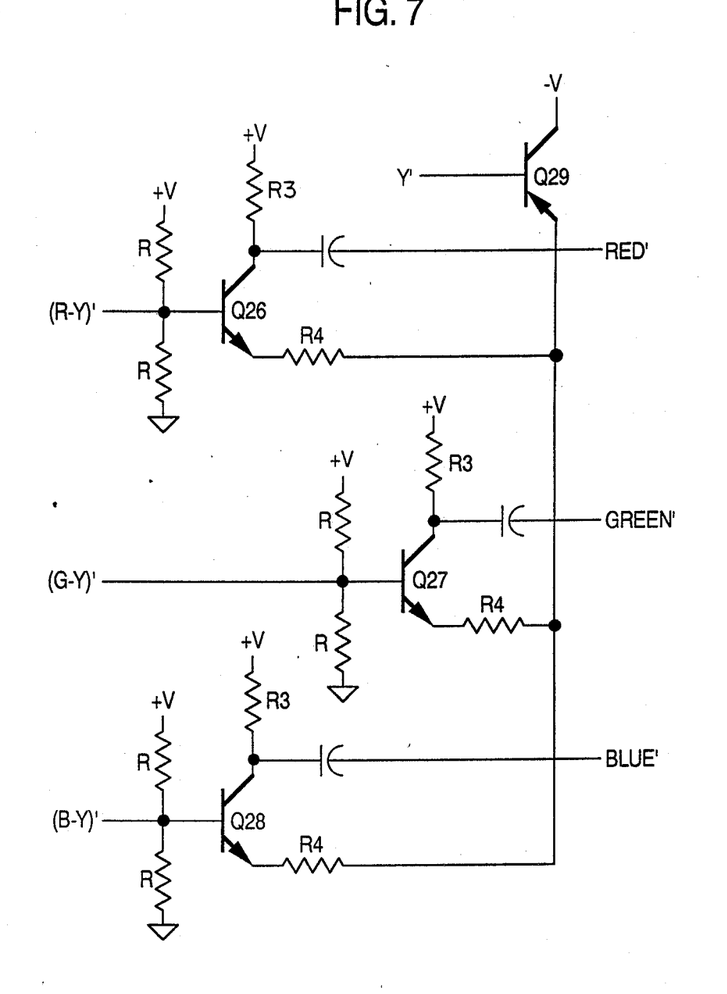
FIG. 7 is a schematic diagram illustrating preferred electrical components for carrying out the functions of the blocks in section VI of FIG. 1.

Filtered color difference signals (RED−Y)', (BLUE−Y)' and (GREEN−Y)' are fed to the summing circuitry illustrated in FIG. 7. This circuit corresponds to adders 74, 76 and 78 and operates to sum filtered difference signals with filtered brightness signal Y to produce approximated output signals RED', GREEN', and BLUE'.

It will be apparent to those skilled in the art that modifications and variations can be made in the apparatus and method for compressing a video signal of this invention. The invention in its broader aspects is not limited to the specific details, represented of method and apparatus, and the illustrative example shown and described. Departures may be made from such details without departing from the spirit or scope of the invention.

What is claimed is:

1. An apparatus for compressing a video signal that includes red, green and blue color video signals comprising:

brightness signal generating means, operating in response to the red, green and blue color video signals, for generating a brightness signal according to a first predetermined formula;

difference signal generating means, operating in response to the red, green and blue color video signals and said brightness signal, for generating at least two color difference signals according to a second predetermined formula;

first encoding means for encoding said brightness signal using pulse code modulation;

second encoding means for encoding said at least two color difference signals using differential pulse code modulation;

storage means for storing said encoded brightness signal and said at least two encoded color difference signals;

decoding means for decoding said encoded brightness signals and said at least two encoded color difference signals to produce a decoded brightness signal and decoded color difference signals; and combining means for combining said decoded brightness signal and said decoded difference signals to form an approximation of the original color video signals.

2. An apparatus according to claim 1, wherein said first encoding means outputs said encoded brightness signal including a multiple bit encoded brightness signal and said second encoding means outputs said at least two encoded color difference signals including two bits representative of two of said color difference signals, and wherein said combining means combines said multiple bit decoded brightness signal and said two bits representative of two of said color difference signals to form said approximated color video signals.

3. A method for compressing a video signal including red, green and blue color video signals, said method comprising the steps of:

generating a brightness signal in response to said red, green and blue color video signals according to a first predetermined formula:

generating at least two color difference signals in response to said red, green and blue color video signals and said brightness signal according to a second predetermined formula;

encoding said brightness signal using pulse code modulation;

encoding said at least two color difference signals using differential pulse code modulation;

storing said encoded brightness signal and said at least two encoded color difference signals;

decoding said encoded brightness signal and said at least two encoded color difference signals to produce a decoded brightness signal and decoded color difference signals; and combining said decoded brightness signal and said decoded color difference signals to form approximated color video signals.

4. A method according to claim 3, wherein said step of encoding said brightness signal comprises outputting a multiple bit encoded brightness signal and said step of encoding said at least two color difference signals comprises outputting two bits representative of said at least two color difference signals.

* * * * *